US011888217B2

(12) United States Patent
Inoue et al.

(10) Patent No.: US 11,888,217 B2
(45) Date of Patent: Jan. 30, 2024

(54) VEHICLE ROOF ANTENNA CONFIGURATION

(71) Applicant: Honda Motor Co., Ltd., Tokyo (JP)

(72) Inventors: Kohei Inoue, Utsunomiya (JP); Patrick J. Ellison, Plain City, OH (US); Taiga Marukawa, Rochester Hills, MI (US); Kosaku Tomozawa, Utsunomiya (JP); Takashi Nakano, Utsunomiya (JP); Akira Futatsuhashi, Utsunomiya (JP); Jagpaul S. Pandher, Plain City, OH (US); Tsuyoshi Higuchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 17/705,567

(22) Filed: Mar. 28, 2022

(65) Prior Publication Data

US 2023/0307823 A1 Sep. 28, 2023

(51) Int. Cl.
*H01Q 1/32* (2006.01)
*H01Q 21/06* (2006.01)
(Continued)

(52) U.S. Cl.
CPC ......... *H01Q 1/3275* (2013.01); *H01Q 1/1207* (2013.01); *H01Q 1/521* (2013.01); *H01Q 21/061* (2013.01)

(58) Field of Classification Search
CPC ...... H01Q 1/12; H01Q 1/1207; H01Q 1/1214; H01Q 1/1221; H01Q 1/32; H01Q 1/325;
(Continued)

(56) References Cited

U.S. PATENT DOCUMENTS

| | | | |
|---|---|---|---|
| 9,315,174 | B2 | 4/2016 | Braennstroem et al. |
| 10,074,895 | B2 | 9/2018 | Sugimoto et al. |

(Continued)

FOREIGN PATENT DOCUMENTS

| | | |
|---|---|---|
| CN | 204103029 U | 1/2015 |
| CN | 205971005 U | 2/2017 |

(Continued)

OTHER PUBLICATIONS

"Transformation Kit from Classic Antenna to Black Shark Fin Antenna for Range Rover Evoque Real AM-FM-DAB Reception," [online] [retrieved on Jan. 12, 2022]. Retrieved from the Internet https://www.qspcars.com/home/seleziona-auto/land-rover/range-rover-evoque/evoque-11-15-/antenne/pinna-di-squalo/transformation-kit-from-classic-antenna-to-black-shark-fin-antenna-for-range-rover-evoque-real-am-fm-dab-recepti.2.9.3101.gp.1969.uw (2 pp).

(Continued)

*Primary Examiner* — Robert Karacsony
(74) *Attorney, Agent, or Firm* — Plumsea Law Group, LLC

(57) ABSTRACT

An arrangement of antennas on a roof of a vehicle is described to minimize radio wave interference. The roof includes an outer panel, a first structural component extending in a lateral direction across the roof, and a second structural component extending in the lateral direction across the roof. The first structural component is closer to a rear edge of the roof than the second structural component. The roof also includes an antenna configuration attached to the roof. The antenna configuration includes a first set of antennas mounted to the first structural component and a second set of antennas mounted to the second structural component. The first set of antennas are spaced apart from the rear edge of the roof by a first distance. The second set of antennas are spaced apart from the edge of the roof by a (Continued)

second distance. The second distance is greater than the first distance.

15 Claims, 6 Drawing Sheets

(51) Int. Cl.
*H01Q 1/12* (2006.01)
*H01Q 1/52* (2006.01)

(58) Field of Classification Search
CPC ...... H01Q 1/3275; H01Q 1/3291; H01Q 1/52; H01Q 1/521; H01Q 1/523; H01Q 21/061; H01Q 21/28
See application file for complete search history.

(56) References Cited

U.S. PATENT DOCUMENTS

| | | | |
|---|---|---|---|
| 10,199,721 B2 | 2/2019 | Suffolk et al. | |
| 11,128,999 B2 | 9/2021 | Abari et al. | |
| 2011/0279337 A1* | 11/2011 | Corwin ................ | H01Q 1/1221 343/906 |
| 2017/0093026 A1 | 3/2017 | Anderson et al. | |
| 2021/0075095 A1 | 3/2021 | Terashita et al. | |
| 2021/0114531 A1 | 4/2021 | Choi et al. | |
| 2021/0284098 A1 | 9/2021 | Scott et al. | |
| 2022/0285831 A1* | 9/2022 | Huelsen ............... | H01Q 1/3275 |

FOREIGN PATENT DOCUMENTS

| | | |
|---|---|---|
| CN | 206250382 U | 6/2017 |
| CN | 110316104 A | 10/2019 |
| CN | 111439255 A | 7/2020 |
| JP | 2011025850 A | 2/2009 |
| KR | 20140033984 A | 3/2014 |

OTHER PUBLICATIONS

"Car Modified Antenna Evo Style Carbon Fiber Shark Fin Tail Shark Antenna Car Modification Accessories," [online] [retrieved on Apr. 19, 2022]. Retrieved from the Internet https://www.aliexpress.com/item/4001351215206.html (9pp).

* cited by examiner

VEHICLE ROOF ANTENNA CONFIGURATION

BACKGROUND

The present disclosure relates to an antenna configuration for a vehicle and more particularly, to an arrangement of blade or fin antennas on a roof of a vehicle which minimizes radio wave interference between the antennas.

Modern vehicles receive and communicate information using radio waves of a variety of different frequencies and bandwidths. Each of these different frequencies and bandwidths may be associated with different systems and functions of the vehicle. For example, a vehicle may receive radio waves associated with audio/visual entertainment functions, navigation functions, command and control functions, vehicle-to-vehicle communication functions, telemetry or data functions, and a variety of other types of communications that may be received or transmitted to and from the vehicle.

In order to receive and/or transmit signals via each of these various frequencies and bandwidths, a vehicle is equipped with multiple antennas configured to facilitate communication over different specific frequencies. The arrangement and placement of these multiple antennas on portions of the vehicle may cause radio wave interference between adjacent antennas, thereby reducing signal quality and clarity.

There is a need in the art for a vehicle antenna configuration that minimizes radio wave interference and that is securely mounted to a roof of a vehicle.

SUMMARY

In one aspect, an antenna configuration for a roof of a vehicle is provided. The antenna configuration includes a first set of antennas spaced apart from an edge of the roof of the vehicle by a first distance. The antenna configuration also includes a second set of antennas spaced apart from the edge of the roof of the vehicle by a second distance. The second distance is greater than the first distance.

In another aspect, an antenna configuration for a roof of a vehicle is provided. The antenna configuration includes a first set of antennas mounted to a first structural component of the roof of the vehicle. The antenna configuration also includes a second set of antennas mounted to a second structural component of the roof of the vehicle. The first structural component is closer to a rear end of the vehicle than the second structural component.

In another aspect, a roof of a vehicle is provided. The roof includes an outer panel, a first structural component extending in a lateral direction across the roof, and a second structural component extending in the lateral direction across the roof. The first structural component is closer to a rear edge of the roof than the second structural component. The roof also includes an antenna configuration attached to the roof. The antenna configuration includes a first set of antennas mounted to the first structural component and a second set of antennas mounted to the second structural component. The first set of antennas are spaced apart from the rear edge of the roof by a first distance. The second set of antennas are spaced apart from the edge of the roof by a second distance. The second distance is greater than the first distance.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

An antenna configuration for a roof of a vehicle is provided that minimizes radio wave interference between adjacent antennas and that is securely mounted to the vehicle roof. In some embodiments, the antenna configuration of the present disclosure may be arranged on a roof of a vehicle in the form of an autonomous ground vehicle. The techniques of the present embodiments may also be applied to antenna configurations arranged on other types of vehicles, such as conventional motor vehicles, electric vehicles, hybrid vehicles, and other types of vehicles configured for air, ground, or water that use multiple antennas for receiving and/or transmitting signals over different radio frequency wavelengths and/or bandwidths.

Figure 1:
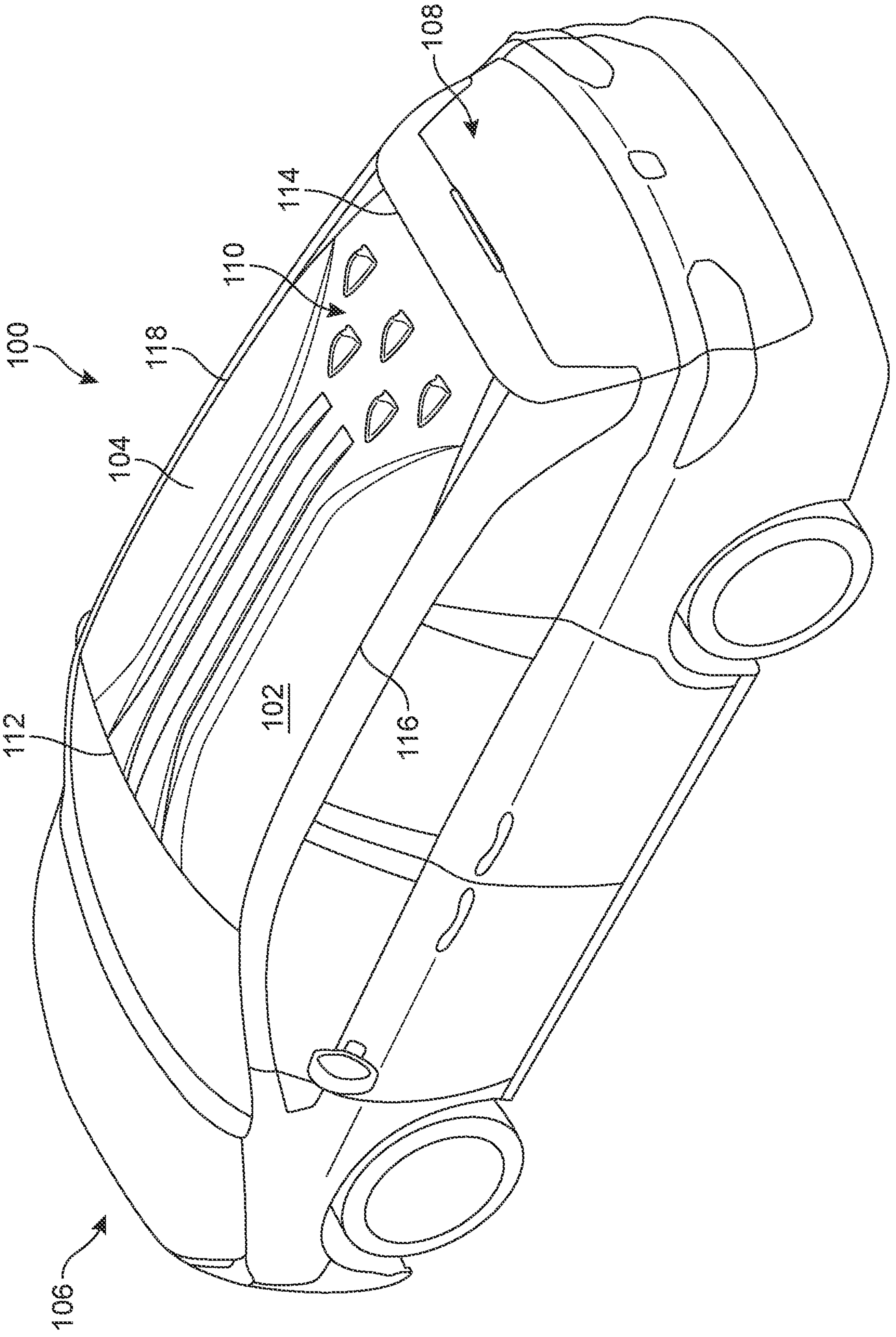
FIG. 1 is an isometric top view of a vehicle with an example embodiment of an antenna configuration in accordance with aspects of the present disclosure.

Referring now to FIG. 1, a vehicle 100 including an antenna configuration 110 according to the principles of the example embodiments described herein is shown. In some embodiments, vehicle 100 may be any type of motor vehicle configured for travel over a ground surface, such as a road, highway, street, etc. In one embodiment, vehicle 100 may be an autonomous ground vehicle configured for autonomous travel over a ground surface. In this embodiment, vehicle 100 includes a roof 102 arranged on the top of vehicle 100. In an example embodiment, antenna configuration 110 is arranged on roof 102 of vehicle 100.

In an example embodiment, roof 102 includes an outer panel 104 that is configured to cover over one or more structural components of vehicle 100 and roof 102 to provide a substantially continuous exterior surface on the top of vehicle 100. In some embodiments, the individual antennas of antenna configuration 110 are mounted on roof 102 of vehicle 100 so that the antennas are exposed on top of outer panel 104. That is, outer surfaces of the antennas of antenna configuration 110 and the exterior surface of outer panel 104 of roof 102 are exposed to air flowing over the top of vehicle 100 as vehicle 100 is moving.

In the present embodiments, the antennas of antenna configuration 110 are in the form of "shark fin" or blade antennas. These shark fin or blade antennas have a generally three-dimensional triangular shape, with a pointed narrow front edge that widens and rises to a larger rear edge. In some embodiments, the shark fin or blade antennas have sides that slope upwards towards a central ridge that runs in a longitudinal direction from the front edge to the rear edge. The shape and form of the shark fin or blade antenna is configured to provide an aerodynamic configuration that does not disrupt airflow traveling over the exterior surface of the vehicle on which the antennas are mounted (e.g., airflow traveling over outer panel 104 of roof 102 of vehicle 100). In an example embodiment, the shark fin antennas may have approximate dimensions of 160 mm in length, 75 mm in width, and 60 mm in height.

In some embodiments, vehicle 100 has a front end 106 and a rear end 108 arranged on opposite ends along a longitudinal direction of vehicle 100. In an example embodiment, antenna configuration 110 is arranged at or near rear end 108 of vehicle 100. For example, as shown in FIG. 1, roof 102 of vehicle 100 extends in the longitudinal direction between a first edge 112 disposed towards front end 106 of vehicle 100 (e.g., a front edge) and an opposite second edge 114 disposed towards rear end 108 of vehicle 100 (e.g., a rear edge). In one embodiment, roof 102 has a generally rectangular shape and includes a first lateral edge 116 extending in the longitudinal direction between first edge 112 and second edge 114 on one side of vehicle 100 and an opposite second lateral edge 118 extending in the longitudinal direction between first edge 112 and second edge 114 on the other side of vehicle 100. Together, first edge 112, first lateral edge 116, second edge 114, and second lateral edge 118 define the generally rectangular shape of roof 102. In other embodiments, roof 102 may have a different shape.

Figure 2:
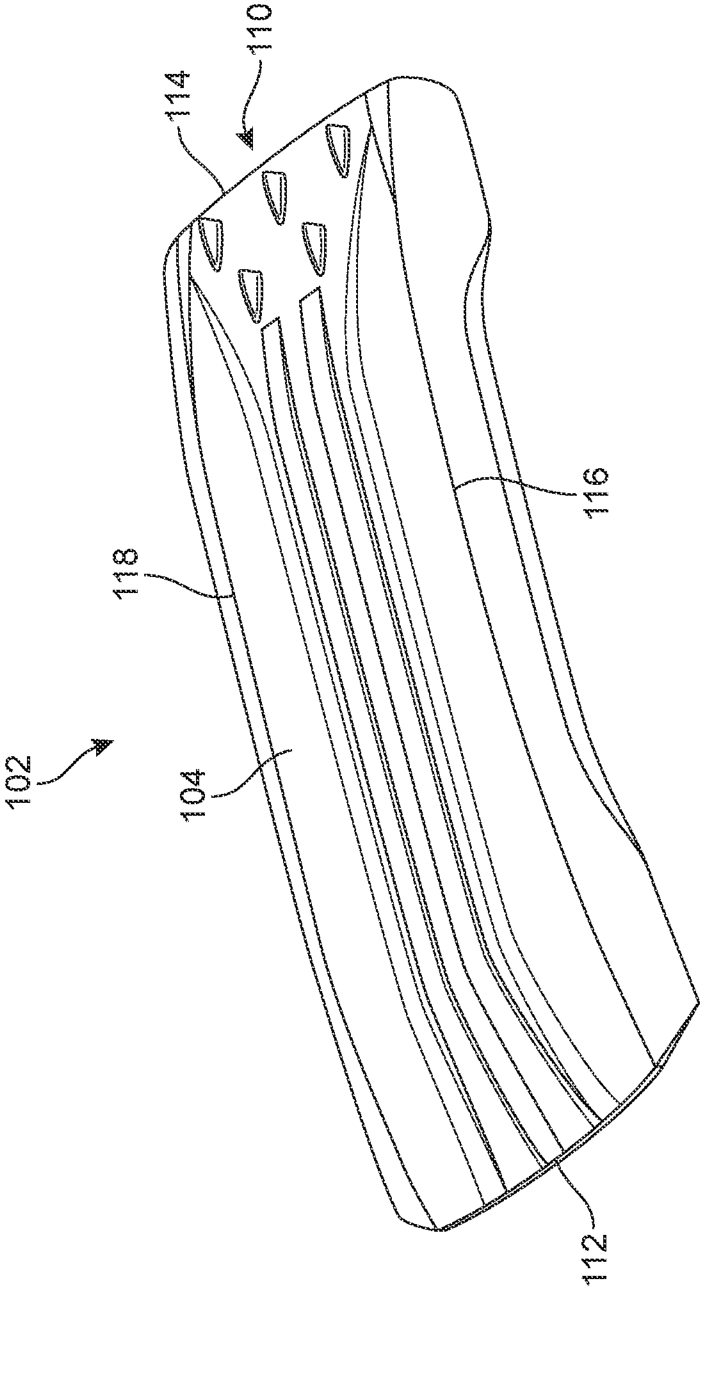
FIG. 2 is an isolated view of a roof of a vehicle with the example embodiment of an antenna configuration in accordance with aspects of the present disclosure.

Referring now to FIG. 2, roof 102 of vehicle 100 is shown in isolation removed from the remaining portion of vehicle 100. In this embodiment, antenna configuration 110 is arranged adjacent to second edge 114 of roof 102. In an example embodiment, each antenna of the antennas forming antenna configuration 110 are arranged with the same orientation so that each antenna faces forward in the same direction. For example, as shown in FIG. 2, the front end of each antenna faces towards first edge 112 and the back end of each antenna faces towards second edge 114. With this arrangement, each antenna of antenna configuration 110 is oriented with the front end facing towards the direction of travel of vehicle 100 on which roof 102 is mounted so as to provide an aerodynamic configuration that does not disrupt airflow traveling over the exterior surface of roof 102.

Figure 3:
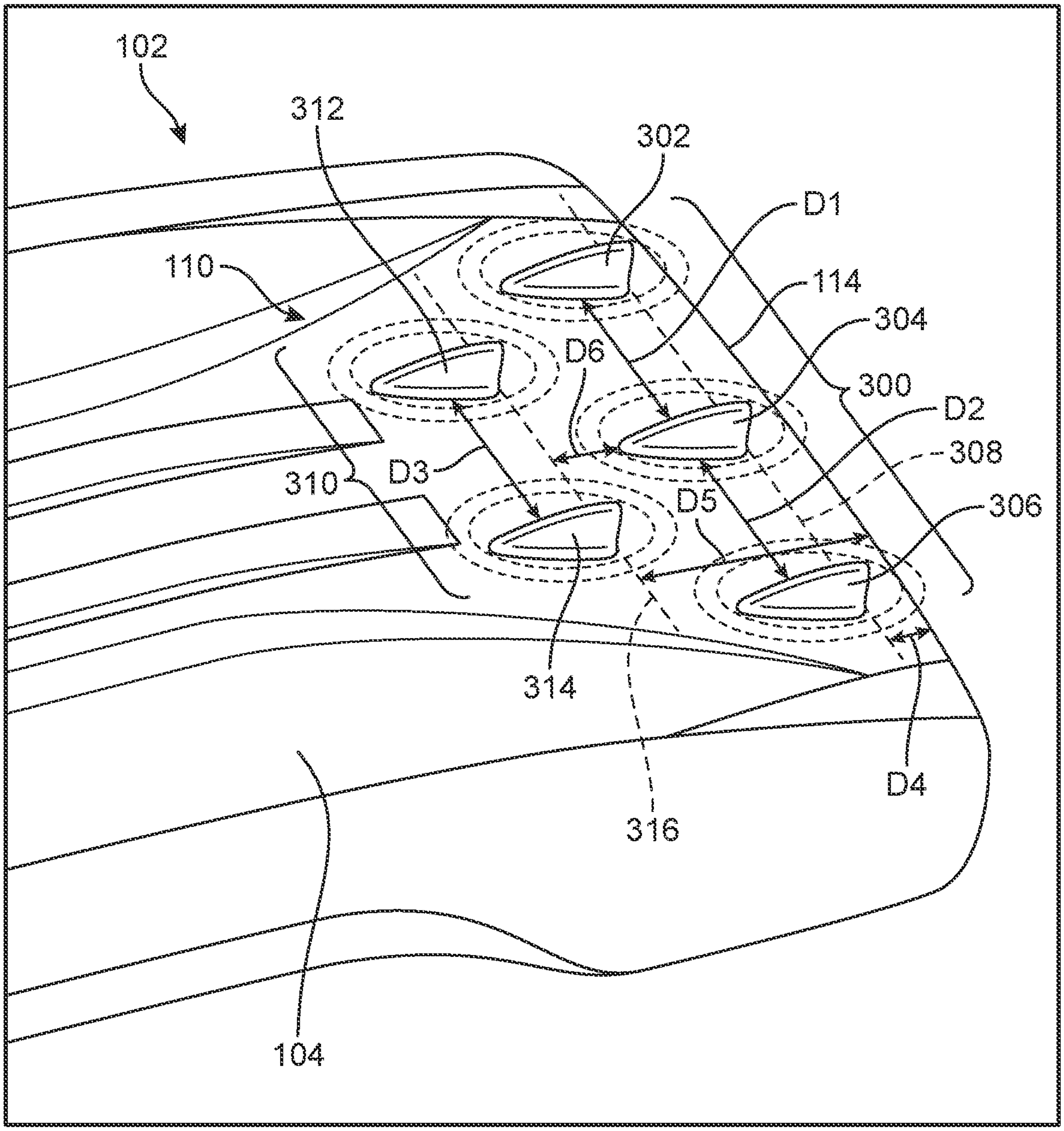
FIG. 3 is an enlarged view of the example embodiment of an antenna configuration in accordance with aspects of the present disclosure.

Referring now to FIG. 3, an enlarged view of a rear portion of roof 102 including antenna configuration 110 is shown. In an example embodiment, the arrangement of the multiple antennas of antenna configuration 110 is selected to minimize radio wave interference between adjacent antennas. In some embodiments, antenna configuration 110 may include two sets of multiple antennas arranged in a spaced relation from each other to minimize radio wave interference between adjacent antennas. For example, in some embodiments, vehicle 100 may be an autonomous ground vehicle that includes antennas for a variety of different frequencies and bandwidths that may be associated with different systems and functions. In one embodiment, vehicle 100 may include five different antennas that are arranged in two different sets of antennas according to antenna configuration 110 of the present embodiments to minimize radio wave interference between the antennas.

In this embodiment, antenna configuration 110 includes a first set 300 of antennas, including a first antenna 302, a second antenna 304, and a third antenna 306. First set 300 of antennas is disposed rearward on roof 102 of vehicle 100 adjacent to second edge 114 of roof 102. In this embodiment, antenna configuration 110 also includes a second set 310 of antennas, including a fourth antenna 312 and a fifth antenna 314. Second set 310 of antennas is disposed forward of first set 300 of antennas on roof 102 of vehicle 100 and is spaced farther from second edge 114 in the longitudinal direction than first set 300 of antennas (e.g., second set 310 of antennas is closer to first edge 112 of roof 102 than first set 300 of antennas).

As described above, the arrangement of each set of antennas (e.g., first set 300 and second set 310) and the arrangement of the individual antennas in each set (e.g., first antenna 302, second antenna 304, and third antenna 306 associated with first set 300 and fourth antenna 312 and fifth antenna 314 associated with second set 310) are selected to minimize radio wave interference between adjacent antennas. As shown in FIG. 3, first antenna 302 and second antenna 304 are separated by a first distance D1 and second antenna 304 and third antenna 306 are separate by a second distance D2. In this embodiment, first distance D1 and second distance D2 are oriented approximately in the lateral direction of roof 102 extending between opposite lateral edges 116, 118. In some embodiments, first distance D1 and second distance D2 may be equal. In other embodiments, first distance D1 and second distance D2 may be different but may both be greater than or equal to a predetermined minimum separation distance.

In some embodiments, first distance D1 and second distance D2 may be in a range of approximately 160 mm to 380 mm. That is, the lateral separation distance between first antenna 302 and second antenna 304 and second antenna 304 and third antenna 306 may be from 160 mm up to 380 mm apart from each other. In one embodiment, first distance D1 and second distance D2 may be approximately 250 mm.

As shown in FIG. 3, fourth antenna 312 and fifth antenna 314 are separated by a third distance D3. In this embodiment, third distance D3 is oriented approximately in the lateral direction of roof 102 extending between opposite lateral edges 116, 118. In some embodiments, third distance D3 may be equal to first distance D1 and/or second distance D2. In other embodiments, third distance D3 may be different from first distance D1 and/or second distance D2 but may also be greater than or equal to the predetermined minimum separation distance. In some embodiments, third distance D3 may be in a range of approximately 160 mm to 380 mm. That is, the lateral separation distance between fourth antenna 312 and fifth antenna 314 may be from 160 mm up to 380 mm apart from each other. In one embodiment, third distance D3 may be approximately 250 mm.

In addition to the separation distances between each individual antenna in each set, the antennas of first set 300 and the antennas of second set 310 may also be spaced apart on roof 102 from each other. For example, in this embodiment, the back edges of each antenna in first set 300 (e.g., first antenna 302, second antenna 304, and third antenna 306) are substantially aligned along a first lateral direction 308 extending between first lateral side 116 and second lateral side 118. In one embodiment, these back edges of each antenna in first set 300 are separated from second edge 114 of roof 102 by a fourth distance D4. In this embodiment, fourth distance D4 is oriented approximately in the longitudinal direction of roof 102 extending between opposite front and rear edges 112, 114. In an example embodiment, fourth distance D4 is selected so that the antennas of first set 300 may be mounted to a structural component of roof 102, as described below. In one embodiment, fourth distance D4 is approximately 75 mm. It should be understood that fourth distance D4 may be larger or smaller, for example, depending on the location of the structural component from rear edge 114 of roof 102.

Similarly, the back edges of each antenna in second set 310 (e.g., fourth antenna 312 and fifth antenna 314) are substantially aligned along a second lateral direction 316 extending between first lateral side 116 and second lateral side 118. In an example embodiment, first lateral direction 308 and second lateral direction 316 are parallel to each other. In one embodiment, these back edges of each antenna in second set 310 are separated from second edge 114 of roof 102 by a fifth distance D5. Fifth distance D5 is greater than fourth distance D4 and is oriented approximately in the longitudinal direction of roof 102 extending between opposite front and rear edges 112, 114. That is, the antennas of second set 310 of antennas are located forward of the antennas of first set 300 of antennas (i.e., second set 310 is closer towards first edge 112 of roof than first set 300). In an example embodiment, fifth distance D5 is selected so that the antennas of second set 310 may be mounted to a structural component of roof 102, as described below. In one embodiment, fifth distance D5 is approximately 225 mm. It should be understood that fifth distance D5 may be larger or smaller, for example, depending on the location of the structural component from rear edge 114 of roof 102.

Additionally, as shown in FIG. 3, the back edges of each antenna in second set 310 are spaced apart from the front edges of each antenna in first set 300 by a sixth distance D6. In some embodiments, sixth distance D6 may be in a range of approximately 100 mm to 180 mm. That is, the longitudinal separation distance between the back edges of the antennas in second set 310 from the front edges of the antennas in first set 300 may be from 100 mm up to 180 mm apart from each other. In one embodiment, sixth distance D6 may be approximately 150 mm.

As described above, the arrangement of first set 300 of antennas and second set 310 of antennas of antenna configuration 110 are configured to minimize or eliminate interference between adjacent antennas. For example, as shown in FIG. 3, antenna reception and/or transmission patterns (represented as broken concentric circles in FIG. 3) for each individual antenna are spaced apart from each other adjacent antenna so that there is no interference (or only minimal interference) between each antenna. In an example embodiment, the antenna reception and/or transmission pattern for each antenna has an area of approximately 500Φ $cm^2$ (e.g., associated with a radius of approximately 160 mm from the center of each antenna). With this arrangement, antenna configuration 110 for roof 102 of vehicle 100 is provided that minimizes radio wave interference between adjacent antennas.

As shown in FIG. 3, antenna configuration 110 includes a total of five different antennas arranged in two sets, including first set 300 having three antennas (e.g., first antenna 302, second antenna 304, and third antenna 306) and second set 310 having two antennas (e.g., fourth antenna 312 and fifth antenna 314). In other embodiments, an antenna arrangement according to the principles described herein may have a different number of sets of antennas and/or a different number of individual antennas in each set without departing from the techniques of the present embodiments.

Figure 4:
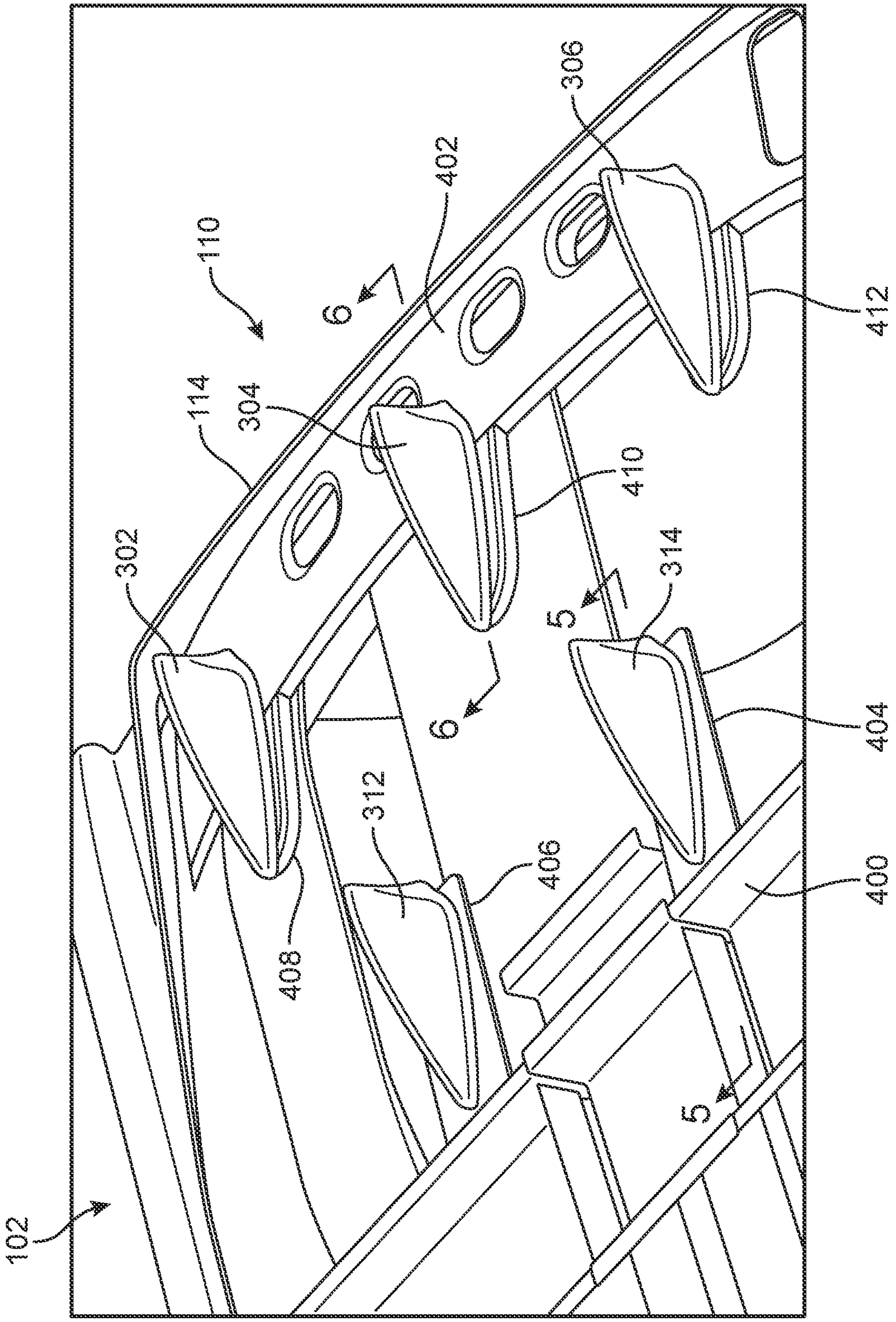
FIG. 4 is an enlarged view of the example embodiment of an antenna configuration shown with the outer roof panel removed in accordance with aspects of the present disclosure.

FIG. 4 illustrates an enlarged view of antenna configuration 110 with outer panel 104 of roof 102 removed so that structural components of roof 102 are visible. In some embodiments, roof 102 may include one or more structural components configured to provide support and rigidity to roof 102 of vehicle. In an example embodiment, roof 102 may include at least a roof bow member 400 and a roof rail upper member 402. Roof bow member 400 and roof rail upper member 402 are configured to extend in a lateral side-to-side direction along roof 102 underneath outer panel 104. It should be understood that a roof of a vehicle (e.g., roof 102 of vehicle 100) may include any number of additional structural components disposed at various locations along the roof to provide structural support and rigidity to the roof of the vehicle.

In this embodiment, roof rail upper member 402 is arranged along second edge 114 of roof 102 at rear end 108 of vehicle 100 and roof bow member 400 is arranged forward of roof rail upper member 402 closer to first edge 112 of roof 102 than roof rail upper member 402 (e.g., in a direction towards front end 106 of vehicle 100). In some embodiments, roof 102 may also include a roof rail lower member (e.g., a roof rail lower member 612 shown in FIG. 6) disposed below roof rail upper member 402 along second edge 114 of roof 102 at rear end 108 of vehicle 100. In one embodiment, roof bow member 400 may have an arch shape to provide additional rigidity. In other embodiments, the shape of the structural components of roof 102, including roof bow member 400 and roof rail upper member 402, may have other shapes. With this arrangement, roof bow member 400 and roof rail upper member 402 provide structural support and rigidity to roof 102 of vehicle 100.

In some embodiments, the antennas of antenna configuration 110 may be mounted to one or more portions of the structural components of roof 102 to provide a secure attachment to roof 102. In an example embodiment, antenna support brackets may be provided to mount each antenna of antenna configuration 110 to a structural component of roof 102. For example, in one embodiment, the antennas of second set 310 of antenna configuration 110 are each mounted to a portion of roof bow member 400 via antenna support brackets. As shown in FIG. 4, fifth antenna 314 is attached to roof bow member 400 using a first antenna support bracket 404 and fourth antenna 312 is attached to roof bow member 400 using a second antenna support bracket 406. First antenna support bracket 404 and second antenna support bracket 406 are attached to a rearward portion of roof bow member 400 (e.g., extending towards second edge 114 of roof 102 at rear end 108 of vehicle 100).

Additionally, the antennas of first set 300 of antenna configuration 110 are each mounted to a portion of roof rail upper member 402 and/or roof rail lower member via antenna support brackets. As shown in FIG. 4, first antenna 302 is attached to roof rail upper member 402 and/or roof rail lower member using a third antenna support bracket 408, second antenna 304 is attached to roof rail upper member 402 and/or roof rail lower member using a fourth antenna support bracket 410, and third antenna 306 is attached to roof rail upper member 402 and/or roof rail lower member using a fifth antenna support bracket 412. Third antenna support bracket 408, fourth antenna support bracket 410, and fifth antenna support bracket 412 are attached to a forward portion of roof rail upper member 402 and/or roof rail lower member (e.g., extending towards first edge 112 of roof 102 at front end 106 of vehicle 100). With this arrangement, by attaching the antenna support brackets (e.g., antenna support brackets 404, 406, 408, 410, 412) to structural components of roof 102 (e.g., roof bow member 400, roof rail upper member 402 and/or roof rail lower member), the antennas of antenna configuration 110 (e.g. antennas 302, 304, 306, 312, 314) may be securely mounted to roof 102 of vehicle 100.

Figure 5:
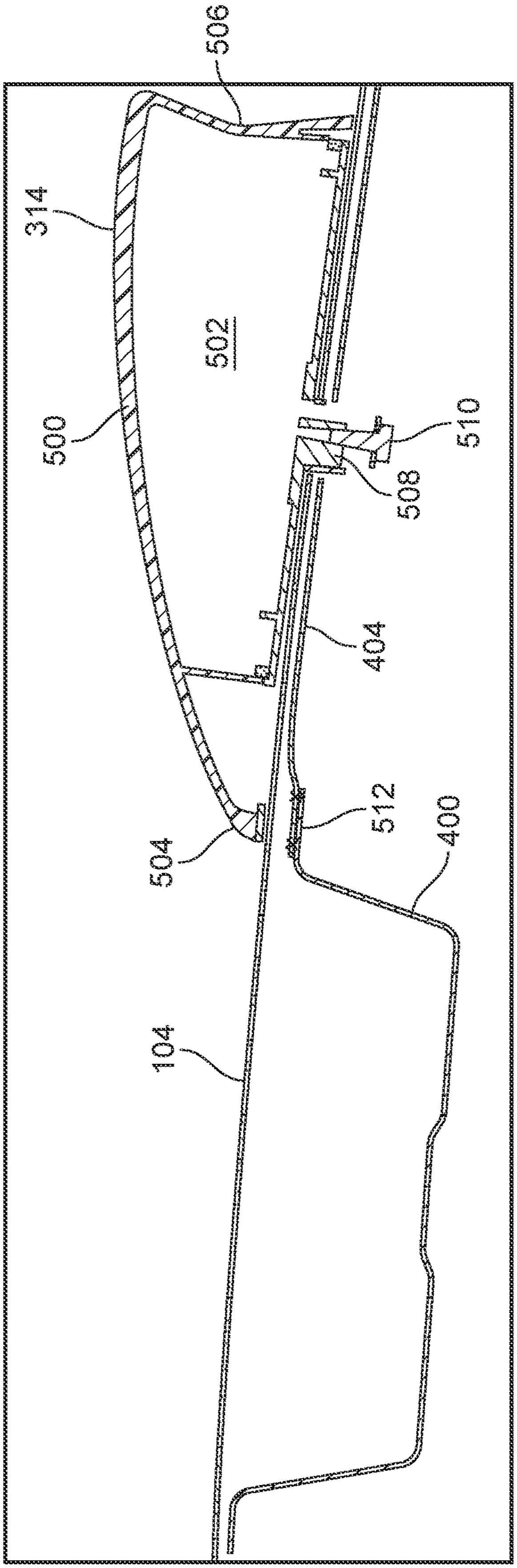
FIG. 5 is a cross-section view of an example embodiment of an antenna taken along line 5-5 shown in FIG. 4 in accordance with aspects of the present disclosure.

FIG. 5 is a cross-section view of an example embodiment of an antenna taken along line 5-5 shown in FIG. 4. In this embodiment, fifth antenna 314 is shown in cross-section and is representative of the antennas in second set 310 of antenna configuration 110. Fourth antenna 312 may have a substantially similar configuration as fifth antenna 314. As shown in FIG. 5, fifth antenna 314 is mounted on top of outer panel 104 of roof 102. In an example embodiment, fifth antenna 314 includes a housing 500 that defines an internal void 502 inside fifth antenna 314. One or more antenna elements configured to receive and/or transmit radio frequency signals are located within internal void 502 inside housing 500 of fifth antenna 314. For example, in some embodiments, the antenna elements inside housing 500 may be disposed on a circuit board or similar hardware.

In an embodiment, housing 500 of fifth antenna 314 may have a substantially triangular three dimensional shape resembling a "shark fin" or blade. In this embodiment, the shape of housing 500 of fifth antenna 314 includes a narrow front edge 504 where the lateral sides of housing 500 meet together at a rounded point and a wider rear edge 506 that extends vertically upwards away from the surface of outer panel 104. In this embodiment, front edge 504 is facing towards front end 106 of vehicle 100 and rear edge 506 is facing towards rear end 108 of vehicle 100.

In some embodiments, fifth antenna 314 may be attached or mounted to first antenna support bracket 404 disposed beneath outer panel 104. As described above, in some embodiments, antenna support brackets may be attached to structural components of roof 102 to provide a secure attachment to roof 102. For example, in this embodiment, first antenna support bracket 404 is attached to roof bow member 400. In one embodiment, first antenna support bracket 404 may be attached to an end 512 of roof bow member 400, as shown in FIG. 5. In some cases, first antenna support bracket 404 may be fixedly attached to roof bow member 400, for example, by bonding using adhesive or welding. In other cases, removeable or non-removable fasteners may be used to attach first antenna support bracket 404 to roof bow member 400.

In an example embodiment, fifth antenna 314 may further include an anchor member 508 that extends through aligned holes or apertures in outer panel 104 and first antenna support bracket 404. In one embodiment, anchor member 508 includes a central opening that is configured to receive a fastener 510. When fastener 510 is inserted into the central opening of anchor member 508, anchor member 508 expands to press against the perimeter of the aligned holes or apertures in outer panel 104 and first antenna support bracket 404 and holds fifth antenna 314 securely in place on outer panel 104 of roof 102 of vehicle 100.

Figure 6:
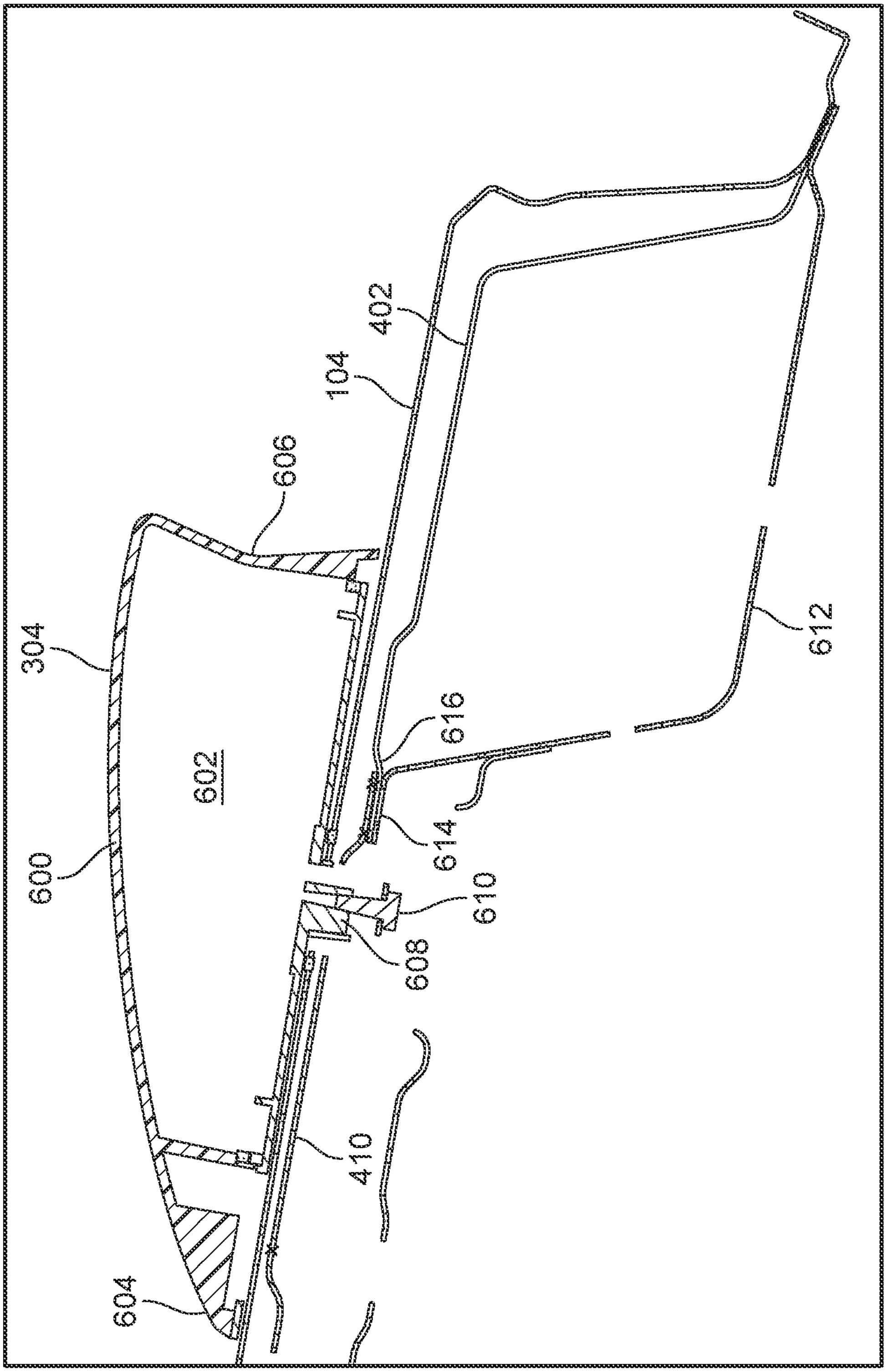
FIG. 6 is a cross-section view of an example embodiment of another antenna taken along line 6-6 shown in FIG. 4 in accordance with aspects of the present disclosure.

FIG. 6 is a cross-section view of an example embodiment of another antenna taken along line 6-6 shown in FIG. 4. In this embodiment, second antenna 304 is shown in cross-section and is representative of the antennas in first set 300 of antenna configuration 110. First antenna 302 and/or third antenna 306 may have substantially similar configurations as second antenna 304.

As shown in FIG. 6, second antenna 304 is mounted on top of outer panel 104 of roof 102. In an example embodiment, second antenna 304 includes a housing 600 that defines an internal void 602 inside second antenna 304. One or more antenna elements configured to receive and/or transmit radio frequency signals are located within internal void 602 inside housing 600 of second antenna 304. For example, in some embodiments, the antenna elements inside housing 600 may be disposed on a circuit board or similar hardware.

In an embodiment, housing 600 of second antenna 304 may have a substantially triangular three dimensional shape resembling a "shark fin" or blade. In this embodiment, the shape of housing 600 of second antenna 304 includes a narrow front edge 604 where the lateral sides of housing 600 meet together at a rounded point and a wider rear edge 606 that extends vertically upwards away from the surface of outer panel 104. In this embodiment, front edge 604 is facing towards front end 106 of vehicle 100 and rear edge 606 is facing towards rear end 108 of vehicle 100.

In some embodiments, second antenna 304 may be attached or mounted to fourth antenna support bracket 410 disposed beneath outer panel 104. As described above, in some embodiments, antenna support brackets may be attached to structural components of roof 102 to provide a secure attachment to roof 102. For example, in this embodiment, fourth antenna support bracket 410 is attached to roof rail upper member 402 and/or a roof rail lower member 612. As shown in FIG. 6, roof rail lower member 612 is disposed beneath roof rail upper member 402. In an example embodiment, roof rail upper member 402 and roof rail lower member 612 are attached to each other at opposite ends. For example, in one embodiment, ends of roof rail upper member 402 and roof rail lower member 612 may be welded or otherwise attached to one another using adhesive or other attachment mechanisms.

In one embodiment, fourth antenna support bracket 410 may be attached to an end 614 of roof rail lower member 612 and/or an end 616 of roof rail upper member 402, as shown in FIG. 6. In some cases, fourth antenna support bracket 410 may be fixedly attached to roof rail upper member 402 and/or roof rail lower member 612, for example, by bonding using adhesive or welding. In other cases, removeable or non-removable fasteners may be used to attach fourth antenna support bracket 410 to roof rail upper member 402 and/or roof rail lower member 612.

In an example embodiment, second antenna 304 may further include an anchor member 608 that extends through aligned holes or apertures in outer panel 104 and fourth antenna support bracket 410. In one embodiment, anchor member 608 includes a central opening that is configured to receive a fastener 610. When fastener 610 is inserted into the central opening of anchor member 608, anchor member 608 expands to press against the perimeter of the aligned holes or apertures in outer panel 104 and fourth antenna support bracket 410 and holds second antenna 304 securely in place on outer panel 104 of roof 102 of vehicle 100.

The techniques described herein with reference to the example embodiments provide an antenna configuration for a roof of a vehicle that minimizes radio wave interference between adjacent antennas and that is securely mounted to the roof of the vehicle.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. An antenna configuration for a roof of a vehicle, comprising:

a first set of antennas mounted to a first structural component of the roof of the vehicle;

a second set of antennas mounted to a second structural component of the roof of the vehicle;

wherein the first structural component is closer to a rear end of the vehicle than the second structural component;

wherein each antenna of the first set of antennas is mounted to the first structural component using an antenna support bracket; and wherein each antenna of the second set of antennas is mounted to the second structural component using an antenna support bracket.

2. The antenna configuration according to claim 1, wherein the first structural component and the second structural component each extend in a lateral direction across the roof of the vehicle.

3. The antenna configuration according to claim 1, wherein the first set of antennas consists of three antennas; and wherein the second set of antennas consists of two antennas.

4. The antenna configuration according to claim 1, wherein the antenna support brackets for the first set of antennas are attached to a forward portion of the first structural component facing towards a front end of the vehicle.

5. The antenna configuration according to claim 4, wherein the antenna support brackets for the second set of antennas are attached to a rearward portion of the second structural component facing towards the rear end of the vehicle.

6. The antenna configuration according to claim 1, wherein the first set of antennas are spaced apart from the second set of antennas by a first distance.

7. The antenna configuration according to claim 1, wherein each antenna of the first set of antennas is spaced apart from each other antenna in the first set by a first separation distance; and wherein each antenna of the second set of antennas is spaced apart from each other antenna in the second set by a second separation distance.

8. The antenna configuration according to claim 7, wherein the first separation distance is equal to the second separation distance.

9. An antenna configuration for a roof of a vehicle, comprising:

a first set of antennas mounted to a first structural component of the roof of the vehicle;

a second set of antennas mounted to a second structural component of the roof of the vehicle;

wherein the first structural component is closer to a rear end of the vehicle than the second structural component;

wherein the first set of antennas consists of three antennas; and wherein the second set of antennas consists of two antennas.

10. The antenna configuration according to claim 9, wherein the first set of antennas are spaced apart from the second set of antennas by a first distance.

11. The antenna configuration according to claim 9, wherein each antenna of the first set of antennas is spaced apart from each other antenna in the first set by a first separation distance; and wherein each antenna of the second set of antennas is spaced apart from each other antenna in the second set by a second separation distance.

12. The antenna configuration according to claim 11, wherein the first separation distance is equal to the second separation distance.

13. A roof of a vehicle comprising:

an outer panel;

a first structural component extending in a lateral direction across the roof;

a second structural component extending in the lateral direction across the roof, wherein the first structural component is closer to a rear edge of the roof than the second structural component; and an antenna configuration attached to the roof, the antenna configuration comprising a first set of antennas mounted to the first structural component and a second set of antennas mounted to the second structural component;

wherein the first set of antennas are spaced apart from the rear edge of the roof by a first distance;

wherein the second set of antennas are spaced apart from the edge of the roof by a second distance;

wherein the second distance is greater than the first distance;

wherein each antenna of the first set of antennas is mounted to the first structural component using an antenna support bracket; and wherein each antenna of the second set of antennas is mounted to the second structural component using an antenna support bracket.

14. The roof according to claim 13, wherein the first set of antennas consists of three antennas; and wherein the second set of antennas consists of two antennas.

15. The roof according to claim 13, wherein the first set of antennas are attached to a forward portion of the first structural component facing towards the front edge of the roof; and wherein the second set of antennas are attached to a rearward portion of the second structural component facing towards the rear edge of the roof.

* * * * *